Dec. 26, 1967  P. L. SCHLUTTIG  3,359,946
PET CARRIER FOR SMALL ANIMALS
Filed June 1, 1966  2 Sheets-Sheet 1

INVENTOR
PEARL L. SCHLUTTIG

BY

ATTORNEY

Dec. 26, 1967    P. L. SCHLUTTIG    3,359,946
PET CARRIER FOR SMALL ANIMALS
Filed June 1, 1966                              2 Sheets-Sheet 2

INVENTOR
PEARL L. SCHLUTTIG

BY

ATTORNEY

3,359,946
PET CARRIER FOR SMALL ANIMALS
Pearl L. Schluttig, Box 7544,
Washington, D.C. 20044
Filed June 1, 1966, Ser. No. 554,397
5 Claims. (Cl. 119—1)

This invention relates to a pet carrier for small animals.

The carrier is collapsible and is made of light materials making it easily transportable by hand or under arm by a person in its collapsed position or by hand in its assembled position carrying a pet. In the latter position it is beneficial for a small pet to be trained to voluntarily walk or be led by a leash, unafraid of suppression or forced pen-in, onto the open carrier. It also has an advantage in preventing rib soreness and other injuries sustained by a dog in handling. It avoids soiling of clothing because of wetness or shedding of the animal experienced in under arm pick up.

The article is designed primarily for carrying a small pet at pet shows, for carrying a small pet across streets or in other perilous conditions.

FIG. 3 is a perspective view of the matress detached from the pet carrier.

FIG. 4 is an enlarged fragmentary sectional view taken longitudinally through the carrier in partly collapsed position;

FIG. 5 is an enlarged fragmentary section taken through the lower part of one of the arms in FIG. 1 to show the flange on the track.

FIG. 6 is an enlarged fragmentary section looking from the right of one of the arms on the lower left end in FIG. 1, revealing the rivet and the spacer in back of each arm.

FIG. 7 is a fragmentary section taken from the upper right in FIG. 1, showing in detail the pin which holds the handle stationary and one of the helical springs.

FIG. 8 is a fragmentary view of one of the lower right arms in FIG. 1 looking outwardly therefrom to show the flange which holds the arms on the track.

Figure 1:
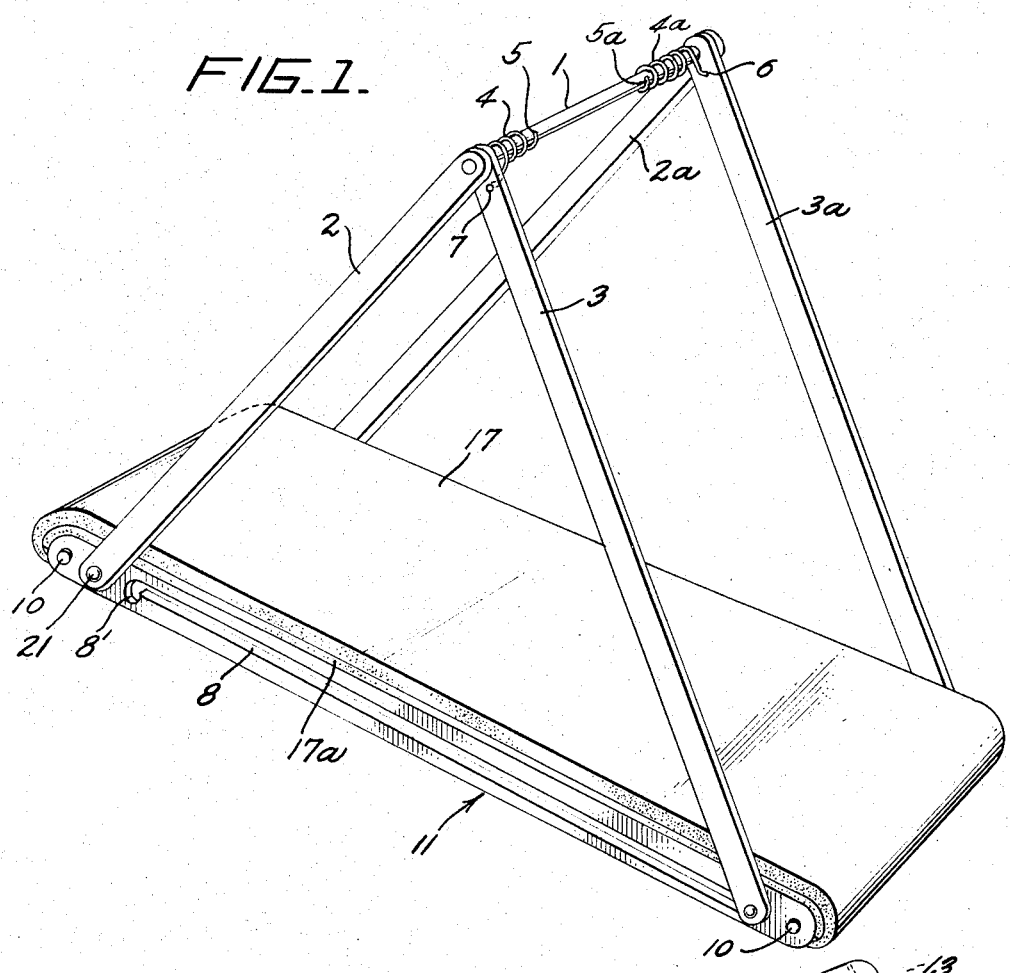
FIG. 1 is a perspective view of my pet carrier for small animals in its normal carrying position.
Figure 2:
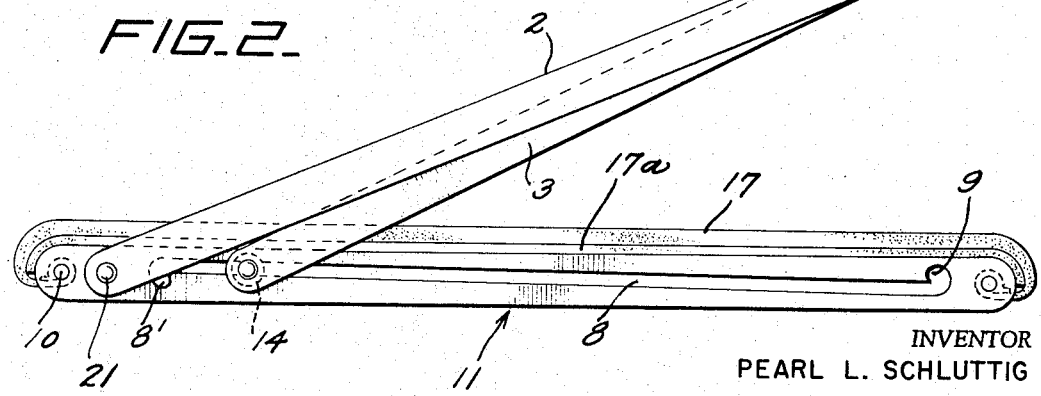
FIG. 2 is a side elevational view of said carrier in partly collapsed position for transporting by the pet handler.

The carrier consists of a carrying frame having a tubular handle 1 connected at each end to arms 2, 2a, 3 and 3a. Said arms are rectangular in cross section with rounded arms. The lower arm ends are connected to side members 11. Between said side members and slightly above is a bed consisting of a mattress 17 of foam rubber or other soft material having curved ends wrapped around rods 10 and a platform or floor member 17a of rigid metallic or plastic composition positioned beneath said mattress. The mattress may be made of non-slip material or may be secured by clips or other well known methods.

The handle has coiled springs 4 and 4a thereon. Said handle is held stationary by pin 13 inserted therein (FIG. 7). Tension is provided by the springs which have their ends 5, 5a, 6 and 7 embedded in the stationary handle and side arms 3 and 3a.

The two side members are similar having slide openings 8 and locking slots 8' and 9 at their ends. These side members are secured to rods 10. Arms 2 and 2a are riveted at their lower ends 21 to the sides and a spacer 15 is provided to allow for the two arms to fold together in collapsed position and to return them to their normal position. See FIG. 6. The lower ends of arms 3 and 3a each have a flange member 14 for keeping these arms on the sliding track opening. By pulling downward on the tensioned handle the arms 3 and 3a will slide across the track opening 8 and will be locked in slot 8'. Arms 2 and 2a will automatically be lowered to a parallel relationship with arms 3 and 3a in collapsed position. Conversely to raise the arms to their normal position in use as a carrier as shown in FIG. 1, it is only necessary to raise by finger-tip pressure, the arm ends carrying the flange member 14 from the slot and pull upwardly on the handle member.

While I have illustrated and described the preferred embodiments of my invention, it is to be understood that I do not limit myself to the precise construction herein disclosed and that various changes and modifications may be made within the scope of the invention as defined by the following claims.

I claim:

1. A structure adapted for carrying small animals comprising a floor member having parallel side members extending along the edge of and laterally of the floor member, a track slot in and extending longitudinally of the side members, locking slots at the ends of each track slot, carrying means comprising two pairs of arms connected by and pivoted to a cross bar forming a carrying handle, two of the arms being pivotally connected at their ends adjacent one end of the side members and the other two arms have means mounted for sliding movement in the track slots, said means engaging alternatively in the locking slots in the erected and collapsed positions of the arms.

2. In the structure of claim 1 in which a pair of springs surround the cross bar and acting to force the pairs of arms toward the front end to lock the slots to hold the arms in erected position and reversely when the arms are in collapsed position said springs force the folded arms in locked position in the rear slot of the slide track.

3. In the structure of claim 1 in which the floor is covered by a mattress member.

4. In the structure of claim 3 in which the mattress is attached to bars extending cross-wise of the floor member to each of the side members.

5. In the structure of claim 1 in which the means mounted for sliding movement in the track slots are headed pins extending through the slots and having a flange preventing their removal from the slots.

References Cited

UNITED STATES PATENTS

| 1,623,409 | 4/1927 | Hempen et al. | 220—94 |
| 2,538,778 | 1/1951 | Halpin | 119—19 |
| 3,156,213 | 11/1964 | Patten | 119—19 |

FOREIGN PATENTS

| 41,967 | 3/1930 | Denmark. |

HUGH R. CHAMBLEE, *Primary Examiner.*